April 19, 1955     J. E. JACOBS ET AL     2,706,791

SEMI-CONDUCTOR

Filed June 18, 1951

INVENTORS:—
JOHN E. JACOBS
RUDOLF FRERICHS
BY:—
Spencer, Johnston, Cook & Root
ATT'YS

United States Patent Office 2,706,791
Patented Apr. 19, 1955

2,706,791

SEMI-CONDUCTOR

John E. Jacobs, Milwaukee, Wis., and Rudolf Frerichs, Evanston, Ill., assignors to General Electric Company, a corporation of New York Application June 18, 1951, Serial No. 232,073

11 Claims. (Cl. 250—83.3)

The present invention relates in general to photosensitive semi-conductors, and has more particular reference to a semi-conductor particularly well suited for X-ray detection purposes, the invention pertaining specifically to the use of mercury sulphide as a photosensitive detector.

Light, broadly speaking, comprises energy emanations or rays of vibratory character having wave lengths within the range of the spectrum, and includes visible light rays as well as rays of invisible character, such as ultraviolet and infrared rays, X-rays, gamma rays, electromagnetic waves, and other rays of vibratory character including rays comprising alpha and beta particles and electrons. These various ray categories within the total light spectrum are ordinarily identified by the characteristic vibratory frequency or wave length range thereof.

For the purposes of the present disclosure, a photosensitive semi-conductor may be defined as a material having electrical resistance, or reactance, or both, which vary in accordance with the intensity of light rays to which the substance is exposed, a particular semi-conductor usually being usefully responsive only to rays within a limited wave length range, characteristic of the material, and being relatively or entirely non-responsive to rays of wave length without such range.

Electrical resistance and reactance, either inductive or capacity reactance, or both, are those characteristics of electrical conductors which tend to prevent or impede the flow of electrical current therethrough under the influence of an electromotive force. The combined flow resistive effect of resistance and reactance, in a given conductor material, is commonly referred to as the electrical impedance of the material.

In the absence of rays to which it is responsive, a semi-conductor may have impedance characteristics of such high order as to constitute the material as an insulator capable of substantially preventing flow of electrical power therethrough. When irradiated with rays to which it is responsive as a semi-conductor, the impedance of the material may be reduced as a proportional function of incident ray intensity, so that the material becomes electrically conducting in proportion to the intensity of exciting rays impinging thereon.

The normal impedance of a semi-conductor, in the absence of exciting rays, while of high order, may permit minimum amounts of electrical current to flow in the material. The current which thus may flow in the absence of exciting rays may be termed the "dark current" characteristic of the material.

The ability of a semi-conductor thus to alter its impedance in response to the intensity of incident rays may be employed for many useful purposes, by connecting the semi-conductor in suitable electrical translation systems designed to perform, or to control the performance of, desired work operations, in response to ray induced changes in the impedance of the so-connected semi-conductor element.

Perhaps the most widely known semi-conductors are those which are particularly responsive to visible light, or to invisible rays such as infrared and ultraviolet rays having wave length in the light spectrum adjacent to that of visible light, such semi-conductors being virtual insulators except when exposed to light rays in the visible portions of the spectrum and in the adjacent infrared and ultraviolet spectral regions. These commonly known semi-conductors, however, are not sufficiently responsive to X-rays to allow the useful application thereof to X-ray detecting purposes.

An important object of the present invention resides in the provision of an effective X-ray responsive semi-conductor material, which is not only sensitive to X-rays but also to light rays within a wide wave length band, including visible light rays, the material, however, being especially well suited for X-ray detecting purposes.

Another important object of the invention is to provide effective X-ray responsive control means adapted to the performance of any desired control function, including X-ray inspection of subjects or objects requiring inspection, X-ray intensity control, regulation of the operating power supplied to X-ray generating equipment, interval timing of X-ray application, and any other operation desirably accomplished in response to the existence of, or the intensity or duration of detectable X-rays.

Another important object is to apply mercury sulphide as a photosensitive semi-conductor material; a further object being to apply the material as a sensitive X-ray detector, and to provide for employing the same effectively in the detection of X-rays as well as other rays.

Another important object resides in the provision of means for employing mercury sulphide as a semi-conductor and for applying the same effectively as a ray detector, by rendering its ray responsive characteristics exceedingly sensitive; a still further object being to provide means for and method of conditioning mercury sulphide to render it exceedingly sensitive by applying thereto, as a sensitizing bias, light rays of selected wave length different from the rays to which it is desired to render the semi-conductor sensitive.

Still another object is to provide for biasing mercury sulphide, specifically for X-ray sensitivity, by applying thereto a visible light bias having wave length of the order of 5200 Angstroms.

Briefly stated, the present invention provides for the detection of penetrating rays, such as X-rays, by using crystalline mercury sulphide as a detector, the response of the detector to incident rays being determined by measuring the alternating current impedance of the detector material, as distinguished from its direct current resistance. In accordance with a preferred mode of practicing the invention, the impedance of the detector is measured in terms of electrical potential produced in an impedance measuring circuit connected with the detector, such potential being applied, as through a suitable translation system, to control the actuation of a relay comprising a load device operable in response to predetermined variation in the intensity of penetrating rays impinging upon the detector. The invention also teaches the possibility of increasing the response sensitivity of mercury sulphide as a ray detector by applying light rays having wave length of the order of 5200 Angstroms as a bias on the detector.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

To illustrate the invention, the drawings show a semi-conductor element 11 comprising a mercury sulphide crystal or crystals, the element being interconnected in a suitable electrical translation system 12, designed to measure the impedance of the crystal in terms of electrical power delivered to a load device 13 connected in the output of the system. The load device 13, of course, may comprise any suitable or preferred means for the performance of any desired operation in response to changes in the measured impedance of the crystal.

Figure 1:
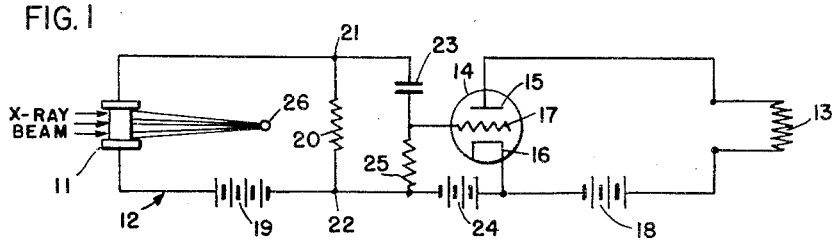
Fig. 1 is a diagrammatic showing of apparatus embodying a semi-conductor for ray detecting purposes.

While any suitable or preferred translation system may be employed, the same, as shown in Fig. 1 of the drawings, may comprise an electronic amplifier including an amplifying tube 14 having an anode or plate 15, an electron emitting cathode 16 and an electron flow regulating grid 17. The plate 15 and cathode 16 may be connected in an output circuit including a suitable electrical power source 18 and the operable device or load 13. The control grid 17 may be interconnected in a grid control circuit in which the crystal 11 is also operatively connected, in order that the grid may be electrically energized for the control of the output circuit in accordance with the transitory impedance value of the element 11, as measured in said control circuit.

As shown, the grid control circuit may comprise the crystal 11, a preferably uni-directional or polarized source 19 of electrical power, and a ballast or control resistor 20, interconnected in series with the source 19 and the crystal element 11, in order that electrical potential, corresponding with the impedance characteristics of the crystal, may be developed between the opposite ends 21 and 22 of the resistor 20. The control grid 17 may be connected with the control circuit, at the connection point 21, preferably through a condenser 23 for filtering uni-directional voltage components and allowing the application of fluctuating voltage components, only, on the grid 17. If it be desired to apply uni-directional as well as fluctuating voltage components on the grid 17, the condenser 23, of course, may be eliminated; and, if desired, means may be provided for excluding fluctuating voltage components while passing only the uni-directional component to the grid, if it be desired to control the load device 13 in response to such uni-directional voltage component.

Means for providing a suitable bias between the cathode 16 and the grid 17 may also be provided, the same preferably comprising a suitable source 24 of grid biasing power and a regulating resistor 25, interconnected in series between the cathode and the grid, the connection point 22 of the control circuit being connected with the grid biasing circuit, as at a connection point between the cathode 16 and the resistor 25.

When the crystal element 11 is exposed to X-rays, in the total absence of visible light, the impedance of the element changes in accordance with the intensity of impinging X-rays. X-rays produced by generating tubes, electrically excited for operation by alternating current power, comprise energy pulsations at a frequency corresponding with the frequency of the energizing power applied to the X-ray generator tube for the operation thereof. When X-rays of pulsating character are applied to the element 11, the change in crystal impedance follows the pulsations of the impinging X-rays exactly, and consequently establishes a corresponding pulsating voltage across the resistor 20, which voltage, being applied to the control grid 17, produces corresponding amplified power pulsations for application to the load device 13. Irradiation of the mercury sulphide crystal element 11 with X-rays of pulsating or fluctuating character also results in the development, across the resistor 20, of voltage having uni-directional as well as fluctuating components. X-rays of uniform non-pulsating character may of course be produced and applied upon the crystal element 11, in which case the voltage developed across the resistor 20 will be of uni-directional character, and consequently the translation system 12 would, of necessity, be designed to measure the magnitude of the uni-directional impedance of the crystal rather than its fluctuating impedance.

Mercury sulphide crystals also exhibit impedance changes when exposed to visible light rays, as from a light source 26, and the extent of such impedance change is in proportion to the intensity of the impinging light rays. Accordingly, when the crystal element 11 is simultaneously exposed to visible light rays from the source 26 and to X-rays, the voltage available at the connection points 21 and 22 contains components which correspond with crystal impedance controlled by visible light and components corresponding with the X-ray controlled crystal impedance. As a consequence, if visible light at uniform intensity is applied on the crystal, the corresponding voltage component across the resistor 20 will also be uniform, while the voltage component corresponding with the impinging X-rays will change in accordance with the intensity of such rays. Where the impinging X-rays comprise intensity pulsations, the same may be applied through the condenser 23 to control the operation of the amplifier, while the uniform voltage component, such as may be established by illumination of the crystal at uniform intensity from the source 26, as well as the uni-directional X-ray induced component, will be excluded from the amplifier system by the action of the condenser 23. Obviously, however, means may be incorporated in the translation system 12 for utilizing either the fluctuating or the uni-directional components induced either by visible rays from the source 26, or by X-rays as circumstances require.

The present invention thus is not necessarily limited to excitation of the crystal element 11 by visible light rays of uniform intensity and by pulsating X-rays, but applies, in its broader aspects, to the excitation of the crystal element by means of visible light, or by means of X-rays, or both, and whether or not the light rays or the X-rays are of pulsating character, there being many possible advantageous applications involving the excitation of the crystal either by X-rays or by visible light rays, or both, where either the visibile light rays or the X-rays are of uniform or of pulsating character. Nevertheless, the present invention particularly contemplates the employment of the crystal element for the detection of pulsating X-rays, where the crystal is illuminated with visible light rays of uniform intensity, applied to the crystal as a light bias, especially where such light bias comprises green light having a wave length of the order of 5200 Angstrom units. By applying such a light bias, the crystal is rendered highly sensitive to impedance changes in response to X-ray irradiation. In this connection, it has been found that when light having a wave length of the order of 5200 Angstroms is directed on a crystal, irradiated with pulsating X-rays, both the uni-directional and fluctuating components of X-ray responsive crystal current are increased by a multiplication factor of the order of 10, as compared with such ray induced components in the absence of the light bias.

The detection characteristics of mercury sulphide crystals do not alter as the result of exposure thereof to X-rays and other light rays. In this connection, the performance of mercury sulphide crystals has been investigated, using X-rays having wave length of 1.54 Angstroms, over a range of X-ray intensities from 100 to 100,000 quanta per second, for crystal excitation. X-rays thus applied to the examined crystals were of pulsating character at a frequency of 60 cycles. Mercury sulphide crystals have thus been subjected to total X-ray energy exceeding $10^{12}$ quanta, with no noticeable change in response characteristics, thus demonstrating that the detection characteristics of the crystals are constant for all practical purposes.

Through the above mentioned intensity range of X-ray irradiation, it has been found that the uni-directional component of crystal current varies substantially linearly with the intensity of incident X-rays, while the alternating component varies as the square of the incident ray intensity. This phenomenon is explainable upon the theory that the alternating component is proportional to the rate of recombination of electrons in the effective conduction band or zone of the irradiated crystal, no such recombination occurring in response to uni-directional electron flow.

Figure 2:
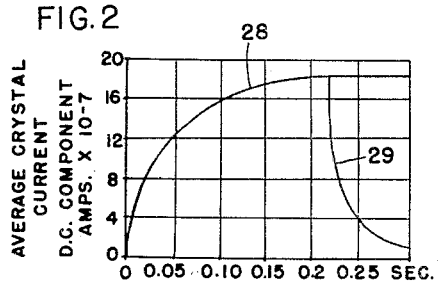
Figs. 2 and 3 are graphical charts illustrating the performance of mercury sulphide as a semi-conductor for X-ray detecting purposes in accordance with the present invention.
Figure 3:
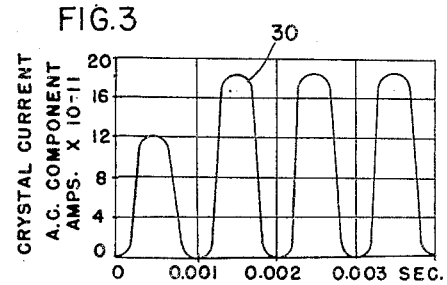

In mercury sulphide crystals the magnitude of the uni-directional component of crystal current is approximately 10,000 times that of the alternating component at intensities of the order of $10^5$ quanta/second. At higher incident X-ray intensities this ratio was reduced, and it is supposed that with increasing intensity, the ratio approaches unity. The time lag before crystal current reaches a maximum value following application of the X-ray beam thereto is of the order of several tenths of a second so far as the uni-directional current component is concerned, but is of the order of $\frac{1}{1000}$ of a second for the alternating component. These characteristics are illustrated in the graphs comprising Figs. 2 and 3, wherein the curve 28 illustrates values of uni-directional crystal current during a period of ¼ of a second following X-ray application on the crystal element. The curve 29 illustrates the decline of crystal current following discontinuation of X-ray application on the crystal. The response curve 30, shown in Fig. 3, was obtained by photographing, as with an electron oscillograph, the fluctuating component of crystal current during the fractional portion of one second following application of X-rays upon the crystal. Upon termination of X-ray irradiation upon the crystal, flow of the alternating component of crystal current ceases immediately, at the conclusion of the energy cycle then in being. The graphs clearly illustrate the appreciable time lag required for the uni-directional component to reach its maximum value, and the almost instantaneous response of the fluctuating current component to maximum value.

The difference between the fluctuating and uni-directional components with respect to speed of attainment of maximum value following initial exposure of the element to X-rays, may be explained upon the theory that the alternating component is a measure of the change in the number of electrons present in the conducting band of the crystal, as a function of time. Employment of the fluctuating component of crystal current, to the exclusion of the uni-directional component, will permit the almost instantaneous measurement of crystal current for the determination of X-ray intensity, thus avoiding the more extended delay necessary to achieve a stable condition when using the uni-directional current component. Measurement of the fluctuating current component only permits the advantageous use of high gain fluctuating current amplifier in the translation systems in the interests of effective instrumentation.

An important advantage of mercury sulphide as an X-ray detector resides in its high absorption of radiation in the wave length zone below 0.12 Angstrom, as a result of the relatively high atomic weight of mercury as compared, for example, with cadmium, the sulphide of which may also be employed as a ray sensitive semi-conductor. An additional advantage lies in the exceedingly high speed response of mercury sulphide to X-rays, which makes it useful in the detection of rays pulsating at high frequency. All m. e. v. (million electron volt) machines, that is to say, X-ray generators provided with electron acceleration facilities for ultra-high electron voltage operation, function at an extremely high frequency pulsation rate in the generated rays, as compared with 60 cycle machines, so that the high speed response of mercury sulphide makes it well adapted to fill the long standing need for an efficient X-ray detector for use with m. e. v. equipment, including so-called resonant transformer units and the betatron.

It will be seen from the foregoing that mercury sulphide is a photosensitive material of the sort affording current amplification characteristics in proportion to the intensity of rays impinging thereon. Semi-conductors operate as such through the release of electrons trapped in the material, such release being accomplished as the result of ray impingement on the material. Commonly known semi-conductors, such as selenium, operate to release electrons in direct proportion to the alteration of the electrical space charge thereof, as the result of exposure to activating rays. Semi-conductors having current amplifying characteristics, however, operate by releasing many thousands or hundreds of thousands of electrons in response to unit alteration of the space charge therein. As a consequence, semi-conductors having amplification characteristics, when excited by the impingement of light rays thereon, operate in fashion comparable to the operation of an electronic amplifying device, whereas selenium and other common semi-conductors do not show such current amplifying characteristics.

In all mercury sulphide crystals that have been examined, currents in excess of $10^6$ times the current resulting from primary ionization of the crystals in response to X-ray irradiation were observed. Any explanation of this phenomenon must account for the release of additional electrons in the crystal, as a result of irradiation thereof, in order to produce the observed current multiplication. The energy necessary to produce this additional or amplified crystal current can only be derived in the crystal itself. Accordingly, the crystals obviously comprise excess electron or donor type semi-conductor material which operates, in a sense, as a current amplifier under the control of visible, as well as invisible, light rays impinging thereon.

A phenomenon associated with mercury sulphide is the response effect obtained by irradiating selected portions of the crystal only. By virtue of the polarity of the power source 19, one end of the crystal element 11 is held electrically negative with respect to its opposite end. By irradiating the crystal with a narrow beam of X-rays progressively from one end of the crystal to its other end, the crystal is found to be substantially inert or unresponsive to X-rays except at and closely adjacent its negative end. As a consequence, in employing mercury sulphite crystals for X-ray detection purposes, it is necessary to apply the beam at the relatively negative end of the crystal element. It is unnecessary to irradiate the remaining portions of the crystal. This circumstance may be of some importance in using mercury sulphide in the detection of rays of known penetrating character. When used for the detection of penetrating rays, including X-rays, it is necessary only that the crystal be disposed in position so that the rays may penetrate to, or otherwise reach, the electrically negative end of the crystal, either by direct application of the rays to such negative end, or by penetration of the rays through the remaining portions of the crystal itself if necessary.

Mercury sulphide crystals occur naturally as cinnabar, and selected natural crystals may be employed for light detecting purposes in accordance with the present invention. Natural crystals, however, may exhibit undesirable lattice aberrations making for eccentric photosensitive response characteristics, and it is therefore preferable, in the interests of response uniformity, to employ crystals grown artificially, as in the laboratory under controlled conditions. To this end, mercury sulphide crystals may be produced by vapor phase chemistry procedures, wherein vaporized mercury is mixed, under controlled conditions, with sulphurated hydrogen in a suitable mixing chamber. From such mingled vapors crystals of mercury sulphide may be grown in the mixing chamber. Such crystals may have atomic impurities, such as sulphur, more or less uniformly distributed in the lattice structures thereof, which impurities impart the desired photosensitive quality in the material, such quality being absent in material which is entirely free of lattice impurities.

The present invention primarily visualizes the practical application of mercury sulphide crystals for improved instrumentation in association with X-ray generators and auxiliary equipment. Since mercury sulphide crystals are responsive to energy rays other than X-rays, the present invention additionally contemplates the possibility of using the crystals for many light detecting purposes to which the same may be suited.

The crystals may be employed separately for detection purposes by placing the crystal in the path of the beam to be detected. So positioned, the crystal, in association with appropriate translation equipment of the sort shown in Fig. 1, or other modified translation systems, for application of the principles herein revealed to particular purposes, may be used for many control purposes, including, for example, the control of the intensity of the irradiating beam at a desired value, by applying the load device 13 to control suitable equipment for directly or indirectly regulating the intensity of the beam. The apparatus may also be employed for liquid level gauging purposes. A crystal and its associated translation system may be employed as a timing device to discontinue the application of the X-ray beam after a selected time interval, which may be determined either in terms of time or in terms of total ray quanta applied to the crystal. Many other uses to which the invention may be applied will, of course, suggest themselves to those skilled in the electronic and X-ray arts.

Several crystals, each with its associated translation system, may be mechanically arranged to form a sensitive screen for the examination of objects, or the several crystals of a screen may be employed in a common translation system. Such screen or screens may comprise a multiplicity of crystals mounted in parallel, closely adjacent relationship with their relatively negative ends facing toward the ray source to be detected, equipment embodying such screens being especially useful in the examination of products, including packaged food products, for the detection of flaws, impurities, or other characteristics of the object under examination. Since the crystals can be made in relatively small sizes, it is obvious that a detection screen of fine grain comprising a multiplicity of closely packed crystals can be made for the detection of exceedingly small features of the examined object, such as small impurities in packaged food and other products.

Screens comprising mercury sulphide crystals may also be made by grinding crystals to desired size, mixing the same into a paste with a suitable binding medium of cementitious character, and then spreading the paste as a layer and curing to form a thin film comprising the light sensitive substance. Alternatively, the granulated material may be compressed to form blocks or pellets and then fired in an atmosphere of sulphurated hydrogen to form a substantially homogeneous compact block or layer of the crystalline material.

Figure 4:
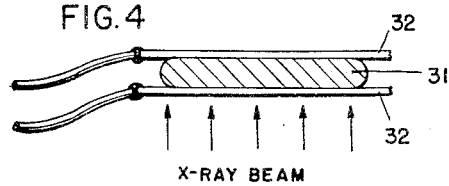
Fig. 4 is a sectional view taken through a detecting element comprising mercury sulphide.

As shown more particularly in Fig. 4 of the drawings, a block or layer 31 comprising a crystalline mercury sulphide may be applied between and in electrical contact with plates 32 of electrical conducting material to form a detecting element, such as the element 11 shown in Fig. 1. The plates 32, where the element is to be used for X-ray detecting purposes, may comprise any convenient material which is transparent or translucent to X-rays, including aluminum or other metal foil; but, of course, where the element is to function in response to visible light rays, at least one of the plates 32 should be formed of material transparent to visible light rays to allow free penetration of the rays to the material 31.

Figure 5:
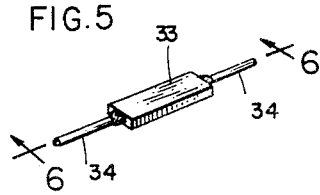
Fig. 5 is a perspective view of a modified form of detecting element embodying mercury sulphide.
Figure 6:
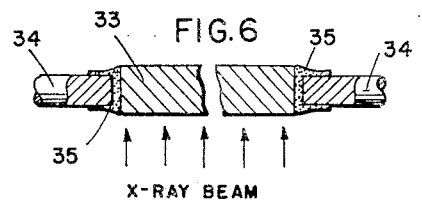
Fig. 6 is an enlarged sectional view taken substantially along the line 6—6 in Fig. 5.

As shown more particularly in Figs. 5 and 6, an elongated block 33 comprising a mercury sulphide crystal or crystals is electrically connected at its opposite ends with conductor members 34 for electrically connecting the element or block 33 in a translation system of the sort shown in Fig. 1, the conductors 34 being secured to the element 33 as by means of a suitable electrical conducting cement 35.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. The method of detecting changes in the intensity level of pulsating X-rays which comprises applying said pulsating X-rays upon mercury sulphide as a semi-conductor to thereby rapidly change the alternating current impedance of the semi-conductor, as a precise function of the intensity of impinging X-rays, while simultaneously changing the direct current resistance thereof at a relatively slow rate, and measuring the alternating current impedance as distinguished from the direct current resistance.

2. The method set forth in claim 1, including the application of visible light rays of selected wave length as a sensitizing bias on the semi-conductor.

3. The method set forth in claim 1, including the application of visible light rays having wave length of the order of 5200 Angstroms as a sensitizing bias on the semi-conductor.

4. The method of detecting changes in the intensity level of pulsating X-rays which comprises applying said pulsating X-rays upon mercury sulphide as a semi-conductor to thereby rapidly change the alternating current impedance of the semi-conductor, as a precise function of the intensity of impinging X-rays, while simultaneously changing the direct current resistance thereof at a relatively slow rate, producing a flow of current in the semi-conductor proportional to the instantaneous values of direct current resistance and alternating current impedance thereof, isolating the alternating current component of said current from the direct current component thereof, and actuating an operable device in response to change in X-ray intensity level as measured by said alternating current component.

5. Control apparatus for actuating an operable load device in response to rapid change in the intensity level of pulsating X-rays comprising mercury sulphide as a crystalline semi-conductor element having alternating current impedance characteristics, variable precisely and substantially instantly as a function of the intensity of pulsating X-rays impinging thereon, and direct current resistance characteristics which laggingly follow any change in pulsating ray intensity, means for continuously passing a flow of current in said element, means for isolating the laggingly responsive direct current component of said current from the alternating current component thereof, and electrical translation means controlled in accordance with said alternating current component for operating the load device substantially instantly in response to rapid changes in the intensity level of said X-rays.

6. Control apparatus as set forth in claim 5, including means to apply on said semi-conductor element a light bias comprising visible light rays having a selected wave length.

7. Control apparatus as set forth in claim 5, including means to apply on said semi-conductor element a light bias comprising visible light rays having wave length of the order of 5200 Angstroms.

8. Control apparatus for actuating an operable load device in response to rapid change in the intensity level of pulsating X-rays comprising mercury sulphide as a crystalline semi-conductor element having alternating current impedance characteristics, variable precisely and substantially instantly as a function of the intensity of pulsating X-rays impinging thereon, and direct current resistance characteristics which laggingly follow any change in pulsating ray intensity, a resistor connected in series with said element, means for continuously passing a flow of current through said resistor and element to develop potential fluctuating as a function of the laggingly responsive direct current resistance and the precisely responsive alternating current impedance of said element, an electronic amplifier having a control grid and drivingly connected with said load device for actuating the same, and a coupling condenser for applying on said grid a controlling potential corresponding with the instantaneous values of the alternating current impedance characteristics of said element.

9. Control apparatus for actuating an operable load device in response to rapid change in the intensity level of pulsating X-rays comprising mercury sulphide as a crystalline semi-conductor element having alternating current impedance characteristics, variable precisely and substantially instantly as a function of the intensity of pulsating X-rays impinging thereon, and direct current resistance characteristics which laggingly follow any change in pulsating ray intensity, a measuring circuit in series connection with said element for circulating therethrough a flow of electric current having alternating current and direct current components respectively proportional to the instantaneous values of the impedance and resistance characteristics of said element, an electronic amplifier having a control grid and drivingly connected with said load device for actuating the same, and a coupling network interconnected with said circuit and said grid for applying said alternating current component on said grid while excluding said direct current component therefrom.

10. X-ray detection apparatus comprising a load device to be operated in response to the detection of X-rays, crystalline mercury sulphide forming a detection element adapted for exposure to X-rays, means for applying light rays of wave length of the order of 5200 Angstroms and of selected substantially constant intensity, as a sensitizing bias on said detection element, means to measure the impedance of said element comprising an electrical power source and a resistor connected in circuit with said detection element, an electron flow amplifier having a control grid, said amplifier being controllingly connected with said load device, and a coupling condenser interconnecting the grid of said amplifier with said circuit to actuate the amplifier in accordance with the alternating current impedance of the detection element as measured in said circuit.

11. X-ray detection apparatus comprising a load device to be operated in response to the detection of X-rays, crystalline mercury sulphide forming a detection element adapted for exposure to the action of X-rays, means for applying light rays of selected wave length and of selected substantially constant intensity as a sensitizing bias on said detection element, means to measure the impedance of said element comprising an electrical power source and a resistor connected in circuit with said detection element, an electron flow translation device having a control grid, said translation device being controllingly connected with said load device, and a coupling condenser interconnecting the grid of said translation device with said circuit to actuate the device in accordance with the alternating current impedance of the detection element as measured in said circuit.

References Cited in the file of this patent

UNITED STATES PATENTS

| | | |
|---|---|---|
| 1,751,361 | Ruben | Mar. 18, 1930 |
| 2,505,633 | Whaley | Apr. 25, 1950 |
| 2,543,039 | McKay | Feb. 27, 1951 |
| 2,537,388 | Wooldridge | Jan. 9, 1951 |
| 2,604,596 | Ahearn | July 22, 1952 |

OTHER REFERENCES

"On the Conductivity Produced in CdS Crystals by Irradiation with Gamma-Rays," Frerichs, Physical Review, vol. 76, #2, December 15, 1949, pp. 1869–1875.

Physical Rev., Series II, vol. II, 1917, pp. 305–306 (201–63 Light Sens.).

"Photoelectricity," Allen, 1913, publ. by Longmans, Green & Co., New York, N. Y., pp. 75–79. (Copy in Div. 54.)

"The Physics of Electronic Semiconductors," Pearson, AIEE Technical paper, 47–34, December 1946, pp. 1–14.